United States Patent
Björkén et al.

(10) Patent No.: US 8,432,841 B2
(45) Date of Patent: Apr. 30, 2013

(54) METHODS AND ARRANGEMENTS IN A RADIO COMMUNICATIONS SYSTEM

(75) Inventors: Peter Björkén, Solna (SE); Paul Schliwa-Bertling, Ljungsbro (SE); Mårten Sundberg, Stockholm (SE)

(73) Assignee: Unwired Planet, LLC, Reno, NV (US)

(*) Notice: Subject to any disclaimer, the term of this patent is extended or adjusted under 35 U.S.C. 154(b) by 392 days.

(21) Appl. No.: 12/739,906

(22) PCT Filed: Oct. 25, 2007

(86) PCT No.: PCT/SE2007/050778
§ 371 (c)(1),
(2), (4) Date: Apr. 26, 2010

(87) PCT Pub. No.: WO2009/054762
PCT Pub. Date: Apr. 30, 2009

(65) Prior Publication Data
US 2010/0302960 A1 Dec. 2, 2010

(51) Int. Cl.
*H04B 7/00* (2006.01)
(52) U.S. Cl.
USPC ........................................................... 370/310
(58) Field of Classification Search .......... 370/229–239, 370/310–349
See application file for complete search history.

(56) References Cited

U.S. PATENT DOCUMENTS

| | | | |
|---|---|---|---|
| 2003/0031203 A1* | 2/2003 | Fukui | 370/469 |
| 2004/0165543 A1* | 8/2004 | Nakazawa | 370/252 |
| 2004/0196801 A1* | 10/2004 | Hiramatsu | 370/328 |
| 2007/0030821 A1* | 2/2007 | Iwamura et al. | 370/328 |
| 2007/0110002 A1 | 5/2007 | Yang et al. | |
| 2007/0268861 A1* | 11/2007 | Diachina et al. | 370/329 |
| 2008/0117891 A1* | 5/2008 | Damnjanovic et al. | 370/345 |

FOREIGN PATENT DOCUMENTS

| | | |
|---|---|---|
| EP | 1 643 784 | 4/2006 |
| EP | 1643784 | 4/2006 |
| WO | 98/48535 | 10/1998 |
| WO | WO 98/48535 | 10/1998 |

OTHER PUBLICATIONS

International Search Report for PCT/SE2007/050778, mailed Sep. 16, 2008.
Written Opinion of the International Searching Authority for PCT/SE2007/050778, mailed Sep. 16, 2008.
International Preliminary Report on Patentability and Written Opinion mailed May 6, 2010 in corresponding PCT Application No. PCT/SE2007/050778.

* cited by examiner

*Primary Examiner* — Jeffrey M Rutkowski
*Assistant Examiner* — Juvena Loo
(74) *Attorney, Agent, or Firm* — Nixon & Vanderhye P.C.

(57) ABSTRACT

The user equipment comprises a radio transmitter arranged to transmit data packets to a receiver on an uplink channel and a receiver arranged to receive data packets transmitted from a transmitter on a downlink channel. The user equipment comprises circuitry that analyzes the received data packets.

8 Claims, 6 Drawing Sheets

METHODS AND ARRANGEMENTS IN A RADIO COMMUNICATIONS SYSTEM

This application is the U.S. national phase of International Application No. PCT/SE2007/050778, filed 25 Oct. 2007, which designated the U.S. and is hereby incorporated by reference.

TECHNICAL FIELD

The technology described relates to methods, a user equipment and a communication network entity in a communication network system and, more particularly to a user equipment and a communication network entity allowing for optimizing the performance of data packet transmissions as well as methods for such optimization.

BACKGROUND

Enhanced Data rates for GSM Evolution (EDGE) is an enhancement of the General Packet Radio Service (GPRS) radio interface in GSM. Nine Modulation and Coding Schemes (MCSs) are defined in EDGE. The lowest MCSs have lower bitrates but are more robust while usage of higher MCSs enables higher bitrates and increased capacity. EDGE also supports Incremental Redundancy (IR) which is a technique for combining transmissions of the same data to increase the decoding success rate.

EDGE Evolution is currently being standardized in the Third Generation Partnership Project (3GPP) Rel-7. The work items include, amongst other things, higher order modulation, dual carrier transmission downlink, reduced latency and dual-antenna terminals. The reduced latency work item includes reduced Time Transmission Interval (TTI), fast Acknowledgement/Negative Acknowledgement (Ack/Nack) reporting and Radio Link Control (RLC) non-persistent mode. Reduced latency is vital for delay sensitive applications like Voice over Internet Protocol (VoIP), which is a system enabling voice data to be delivered using the IP.

Usually a conversational service, such as VoIP, will have a mouth-to-ear delay requirement in order to assert an acceptable conversation quality. In a cellular system the mouth-to-ear delay basically includes one delay in the transmitting link, from the user equipment (UE) to the Base Station Controller (BSC) uplink (UL), and one delay on the receiving link, from BSC to UE downlink (DL). VoIP usually has a pre-defined delay budget e.g. 300 ms mouth-to-ear. All packets then need to be transferred within this delay budget.

With reduced latency the VoIP delay budget may include and be limited to one RLC retransmission on both uplink and downlink directions, called RLC non-persistent mode. This increases the coverage of the VoIP application since IR increases the decoding success rate for a retransmission. The capacity is also increased since modulation and coding schemes, MCS, carrying larger payload may be used.

The enabling of one RLC retransmission on both DL and UL increases the coverage and capacity of the VoIP service. However, if two retransmissions could be utilized in either link then the gain would be even higher. If information about the age of each Protocol Data Unit (PDU) conveying speech samples can feasibly be provided to the entity controlling the radio link at the receiving end, it could be taken advantage of as outlined above.

However, GSM/EDGE Radio Access Network (GERAN), where the BSC/Packet Control Unit (PCU) controlling the radio link entity at the receiving end does not know the status of the VoIP data that arrives, another approach to estimate the state/age of the VoIP data is required.

Thus, a generic solution for communication systems where the explicit information about the age of the PDUs conveying the VoIP data is not available to the radio link entities at the receiving ends that are utilizing a limited number of retransmissions over the air interface is needed.

SUMMARY

A communication network entity improves the performance of data packet transmissions between two user equipments via the communication network entity over an uplink transmission link and a downlink transmission link, whereby a pre-defined transmission delay is allowed for the data packets to travel from one of the user equipments to the other of the user equipments.

Received data packets originating from the uplink transmission link are analyzed for the downlink transmission link. Based on the analyzed data packets, a transmission delay on the uplink transmission link is estimated and remaining transmission delay for said downlink transmission link is determined. Based on the determined remaining transmission delay, an action is selected for data packets which efficiently uses available radio resources on the downlink transmission link. Thereafter, the data packets are transmitted on the downlink transmission link to a receiving user equipment.

A user equipment improves the performance of data packet transmissions between two user equipments via a communication network entity over an uplink transmission link and a downlink transmission link, whereby a pre-defined transmission delay is allowed for data packets to travel from one of the user equipments to the other of the user equipments. Data packets on the downlink transmission link are received from the communication network entity, in which communication network entity the data packets originating from the uplink transmission link have been analyzed, a transmission delay on said uplink transmission link based on said analysed data packets has been estimated. A remaining transmission delay for the downlink transmission link has been determined. An action for the analyzed data packets has been selected based on the determined remaining transmission delay which efficiently uses available radio resources on the downlink transmission link. The received data packets are then analyzed in the user equipment.

A communication network entity improves the performance of data packet transmissions between two user equipments over an uplink transmission link and a downlink transmission link, whereby a pre-defined transmission delay is allowed for the data packets to travel from one of the user equipments to the other of said user equipments. A communication network entity improves the performance of data packet transmissions between two user equipments. The communication network entity comprises circuitry for analyzing for the downlink transmission link, received data packets originating from the uplink transmission link. A transmission delay on said uplink transmission link is estimated based on the analyzed data packets. A remaining transmission delay for the downlink transmission link is determined. For analyzed data packets, an action is selected based on the determined remaining transmission delay which efficiently uses available radio resources on the downlink transmission link. Thereafter, the data packets are transmitted on the downlink transmission link to a receiving user equipment.

A user equipment improves the performance of data packet transmissions between two user equipments via a communication network entity over an uplink transmission link and a downlink transmission link. A pre-defined transmission delay is allowed for data packets to travel from one of the user equipments to the other of said user equipments. A user equipment comprises circuitry for receiving data packets on the downlink transmission link from the communication network entity, in which communication network entity data packets originating from the uplink transmission link have been analyzed, a transmission delay on said uplink transmission link based on said analysed data packets has been estimated. A remaining transmission delay for the downlink transmission link has been determined. An action for the analyzed data packets has been selected based on the determined remaining transmission delay which efficiently uses available radio resources on the downlink transmission link. The user equipment further comprises circuitry for analyzing the received data packets.

The improved methods and arrangements which estimate the remaining delay budget for transfer by analyzing the packet arrival times from one link provide major improvements in coverage and capacity with a flexible delay budget and link quality control, since both links (UL & DL) will be uncorrelated, i.e., the radio link quality on one link is not correlated with the quality of the other link.

Other objects and features will become apparent from the following detailed description considered in conjunction with the accompanying drawings. It is to be understood, however, that the drawings are designed solely for purposes of illustration and not limiting to the claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
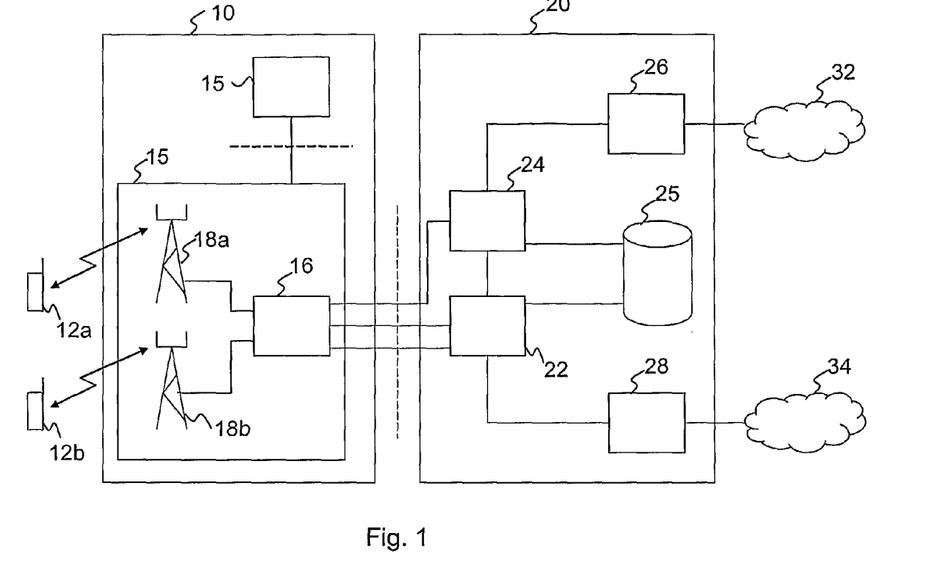
FIG. 1 is an exemplary block diagram of a mobile communication network.

A block diagram of an exemplary 3GPP GSM system network is shown in FIG. 1. The network comprises a radio access network (RAN), which in the preferred example embodiment is a GSM/EDGE Radio Access Network (GERAN) 10 and a core network (CN) 20. The GERAN 10 and the CN 20 provide communication and control for a plurality of user equipments (UE) 12 (two are shown in FIG. 1).

The GERAN architecture 10 comprises a plurality of Base Station Systems (BSS) 15 each controlled by a Base Station Controller (BSC) 16 which is connected to a set of Base Transciever Stations (BTS) 18. The BTSs 18 comprise the antennas, RF equipment and baseband processing circuits needed to communicate with the MSs 12. The BTSs 18 are connected to the BSC 16 through the Abis-interface. The architecture 10 further comprises a Packet Control Unit (PCU), which is considered a part of the BSC 16 and using BSC internal signals may provide the signalling between the BSC and the PCU. The PCU 16 is responsible for the following MAC and RLC layer functions:

LLC layer PDU segmentation into RLC blocks for downlink transmission;

LLC layer PDU reassembly from RLC blocks for uplink transmissions;

PDCH scheduling functions for the uplink and downlink data transfers;

PDCH uplink ARQ functions, including RLC block ack/nak;

PDCH downlink ARQ function, including buffering and retransmission of RLC blocks;

channel access control functions, e.g. access requests and grants; and radio channel management functions, e.g. power control, congestion control, broadcast control information, etc.

The core network 20 typically comprises at least one Serving GPRS Support Node (SGSN) 22, one or more Gateway GPRS Support Node (GGSN) 28, at least one mobile switching center (MSC) 24, which may include a visitor location register (VLR) (not shown in FIG. 1), a Gateway MSC (GMSC) 26, and a home location register (HLR) 25. The CN 20 provides both circuit-switched and packet data communication with various external networks, typically including the Public Switched Telephone Network (PSTN) 32 and one or more packet mode communication network, such as the Internet 34. The GERAN 10 connects to the CN 20 through the A and Gb interface.

According to a preferred example embodiment, the communication system is herein described as a GSM communication system. The skilled person, however, realizes that the method and arrangement works very well on other packet based communications systems as well, such as a Long Term Evolution (LTE) system, the W-CDMA system and the CDMA2000 system. The user equipments 12 may be mobile stations such as mobile telephones ("cellular" telephones) and laptops with mobile termination and thus can be, for example, portable, pocket, hand-held, computer-included or car-mounted mobile devices which communicate voice and/or data with the RAN.

The technology described enables improved coverage and capacity of data packet transmission services, such as a conversational service, a video service or any delay sensitive service by a method where the packet data arrival is analyzed and where the MCS selection is based on the concluded delay budget. By way of example only, VoIP is used herein as a preferred example embodiment. The skilled person realizes, however, that the technology described works very well on other services as well.

The packets arriving at the BSC/PCU 16 from the UE 12 will not include information regarding the transfer in the previous link, which would help to determine the remaining delay budget based on the required mouth-to-ear delay of the service. The solution is to apply an analysis of packet data arrival in the BSC/PCU 16 in order to estimate the packet delay on the previous transmission link.

If the packets are delivered in-sequence from the previous link the arrival of the packets will be burstier if the packet loss is higher in the previous transmission link (=higher delay), whereas if the packets are arriving in a periodic manner, as originally transmitted, a smaller delay is assumed.

Below follows some examples of packet analysis possible at the receiver BSC/PCU, but also at the receiving user equipment:

- Optionally, analyzing to which service a received packet belongs to, e.g. a VoIP packet may be confirmed by means of a pre-determined QoS attribute.
- Estimating the Packet Inter-arrival Time (PIT) by monitoring arrival of individual packets and/or by measuring number of packets arrived during a time period.
- Determining delay budget for individual packets by analyzing data flow and using PIT.
- Concluding maximum allowed retransmissions for individual data packets.
- Concluding a time-out value for individual data packet.
- Selecting appropriate MCS for optimal robustness considering number of allowed re-transmissions.

A conversational service is often characterized by transmission of multiple data packets originating from periodic generation. Typically, speech frames are generated every 20 ms and these may be transmitted as IP packets e.g. every 20/40/60 ms having 1/2/3 frames respectively per packet. Given that VoIP packets are transmitted on an error free link in the UL, the packets will arrive with the same periodic separation for the DL transfer, thus having a large delay budget since no retransmissions are made in the UL. The worse channel quality on the UL, the more will the arrival of packets deviate from the periodic arrival. With a bursty packet arrival the delay budget is lower.

If an analysis is made based on the bullets above and applied to each data packet there is a substantial improvement of the conversational service.

Figure 2:
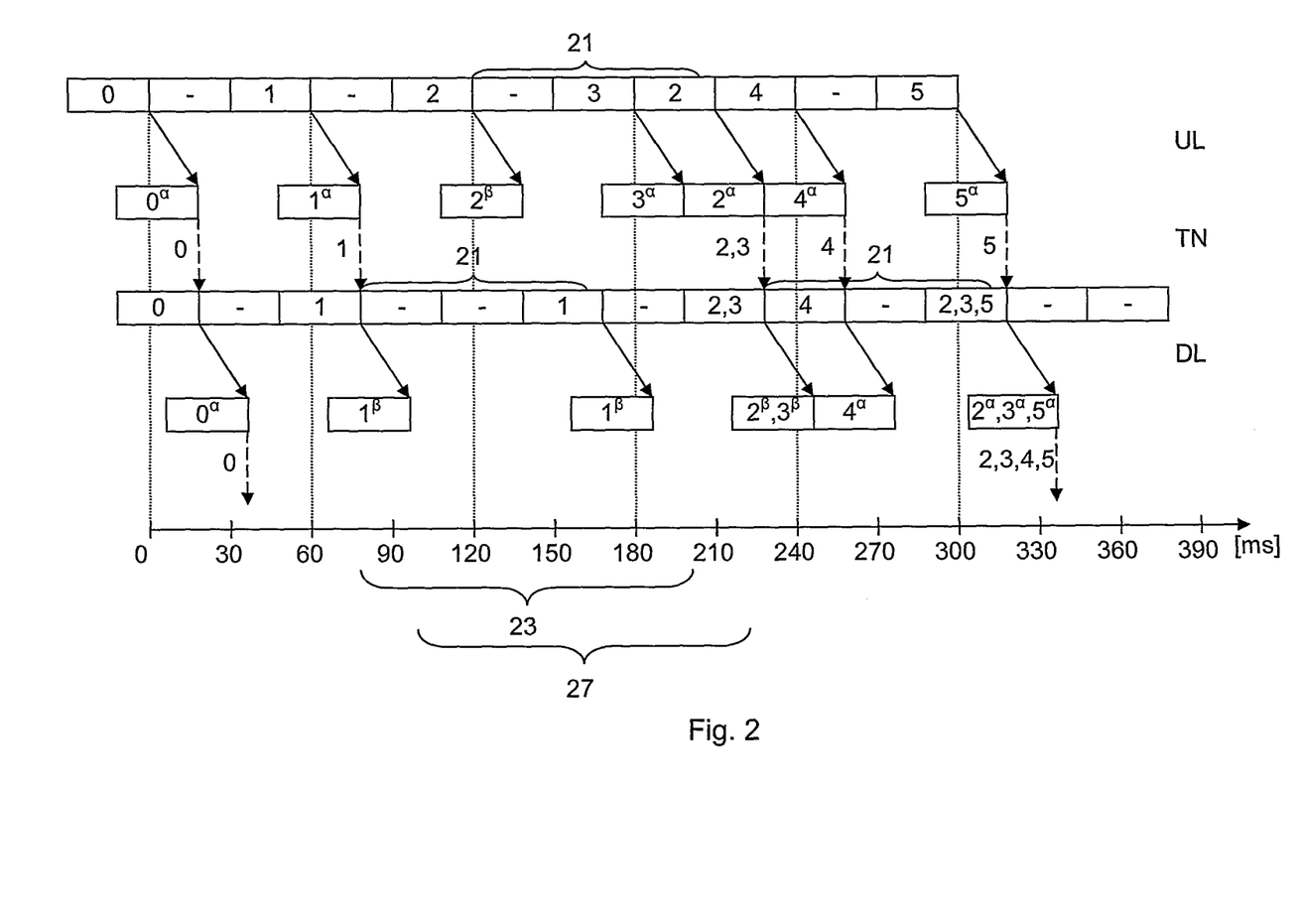
FIG. 2 is a flow chart of a conversational service using a RLC non-persistent mode.

FIG. 2 shows a flowchart of a conversational service using RLC non-persistent mode with a Non-Persistent Timer (NPT) of 120 ms, i.e. the dynamic RLC non-persistent mode has not been used. No delay is assumed over the transport network (TN). In FIG. 2, $x^\alpha$ is the correctly received packets for sequence number x and, $y^\beta$ is the erroneously received packets for sequence number y. All blocks, except sequence number, SN, 1 are delivered in the example within the end-to-end delay requirement of 250 ms. An RLC non-persistent timer, NPT, of 120 ms is applied to all blocks in each direction. The NPT of SN 1 will expire on the downlink, DL, since the timer value is set irrespective of the transmission time on the UL. The expiration of NPT in the network entity for SN=1 is denoted 23 and the expiration of NPT in the user equipment for SN=1 is denoted 27. Thus, SN 1 is discarded and never delivered. In FIG. 2 the Round-Trip-Time (RTT) is denoted 21 and the continuous arrows illustrate a transfer time on UL/DL. The broken arrows reflect the TN.

Figure 3:
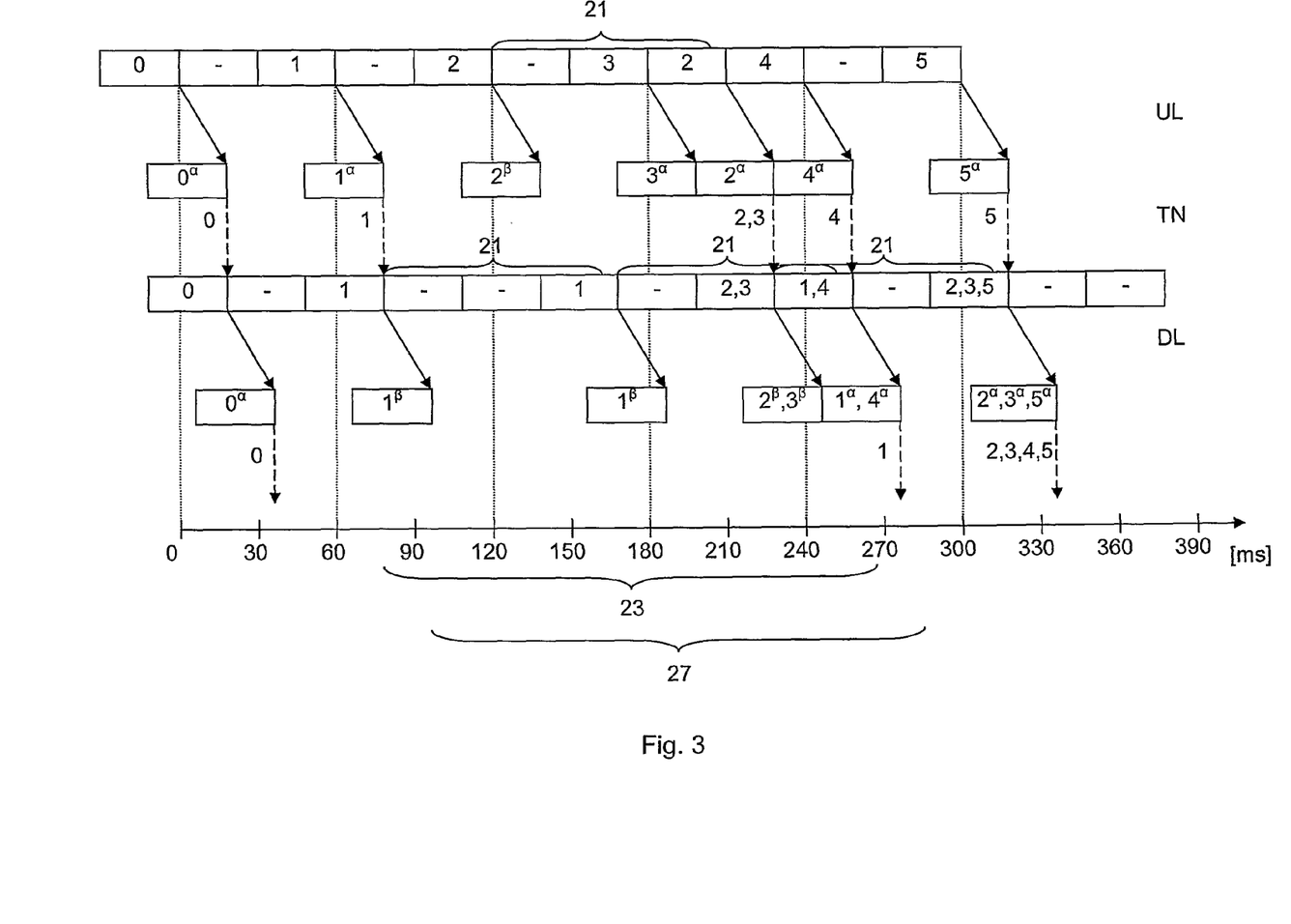
FIG. 3 is a flowchart of a conversational service using a dynamic RLC non-persistent mode.

FIG. 3 shows a flowchart of a conversational service (only one direction shown) using dynamic RLC non-persistent mode with a NPT of 120 ms on the UL and dynamic NPT on the DL, i.e. the dynamic RLC non-persistent mode has been used. No delay is assumed over the transport network. In FIG. 3, $x^\alpha$ is the correctly received packets for sequence number x and, $y^\beta$ is the erroneously received packets for sequence number y. All blocks are delivered in the example of FIG. 3 within the end-to-end delay requirement of 250 ms. Compared to the previous example, shown in FIG. 2, the transmitter on the DL will analyze the arrival time of the packets from the UL. Since 0 and 1 arrives with an expected packet inter arrival time, PIT, it is assumed that the transmission on the previous link was successful without any retransmissions, thus an NPT of approx 200 ms could be set to these SNs. Since SN 1 needs 180 ms to be delivered on the DL, this saves the block from not being delivered. The expiration of NPT in the network entity for SN=1 is denoted 23 and the expiration of NPT in the user equipment for SN=1 is denoted 27. In FIG. 3 the Round-Trip-Time (RTT) is denoted 21 and the continuous arrows illustrate a transfer time on UL/DL. The broken arrows reflect the TN.

Calculated Example

Figure 4:
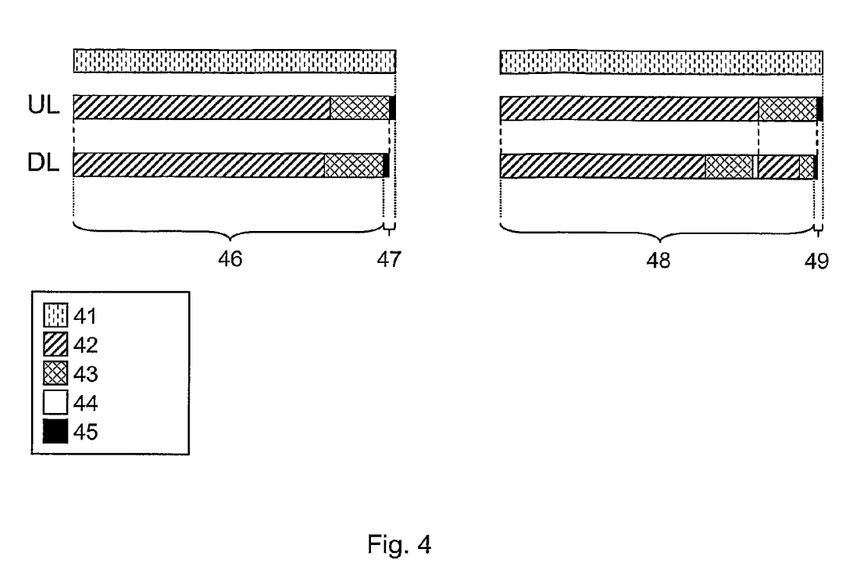
FIG. 4 is an illustration of calculated examples of a gain achieved with the described technology.

To estimate an example gain from using the described technology, a simple calculation can be made. In the following it is assumed that the end-to-end delay budget allows for, in total (over both links), two retransmissions. It is assumed that 1000 blocks are transmitted from the uplink transmitter. The example is illustrated in FIG. 4, in which transmitted packets on the uplink are denoted 41, received packets after the first attempt are denoted 42, received packets after the second attempt are denoted 43 and received packets after the third attempt are denoted 44. Discarded/erroneous packets are denoted 45. The example on the left side of FIG. 4 is without the dynamic RLC non-persistent mode, wherein 46 illustrate received packets and 47 lost packets. The example on the right side of FIG. 4 is with the dynamic RLC non-persistent mode, wherein 48 illustrate received packets and 49 lost packets.

The Block Error Rates, BLERs, for the different transmissions are:

$BLER_1=0.2$
$BLER_2=0.06$
$BLER_{>2}=0$ (it is assumed that incremental redundancy is used in all transmissions, reducing the BLER for each incremented transmission).

On the UL, the RLC non-persistent mode will discard all packets needing more than one retransmission: 1000*0.2*0.06=12 blocks. This loss is not dependent on the use of the described technology.

Thus, on the DL the transmitter receives 1000−12=988 blocks.

Without Dynamic RLC Non-Persistent

All 988 blocks are assumed to have a delay budget allowing for 1 retransmission. This means that the number of RLC blocks lost on the DL is: 988*0.2*0.06≈12 blocks.

Thus, in total there is a Frame Erasure Rate, FER, of (12+12)/1000=2.4%.

With Dynamic RLC Non-Persistent

In the following calculations it is assumed that the DL transmitter has the ability to analyze the packet arrival from the UL making correct assumptions for the DL delay budget.

Further it is assumed that the DL receiver (the user equipment) has the ability to analyze the packets from the DL transmitter (such as the BSC/PCU). According to one example embodiment, this is done by signalling in the transmitted data packets e.g. by using a bit of the header of the data packet showing maximum allowed re-transmissions. Thus, a zero (0) could represent one re-transmission and a one (1) could represent two re-transmissions. According to another embodiment, a time-out value in the user equipment is determined, either by signalling a time-out value from the BSC/PCU or by analysing the received data packets in the user equipment. Such analysis is done in a similar way as the analysis in the BSC/PCU, i.e. by estimating the Packet Inter-arrival Time (PIT) by monitoring arrival of individual packets and/or by measuring number of packets arrived during a time period.

1000*0.8=800 blocks are allowed to have 2 retransmissions on the DL since there was no retransmission for these blocks on the UL. All 800 are received correctly since the BLER of the third transmission is 0.

(1000−800)*(1−0.06)=188 blocks need one retransmission before they are delivered to the DL. Since the delay budget allows for one retransmission on the DL, the number of discarded blocks, on DL, is 188*0.2*0.06≈2 blocks.

Thus, assuming ideal dynamic RLC non-persistent mode on the DL will decrease the FER on that link with more than 80% compared to legacy RLC non-persistent mode.

In total there is a FER of (12+2)/1000=1.4%.

Figure 5:
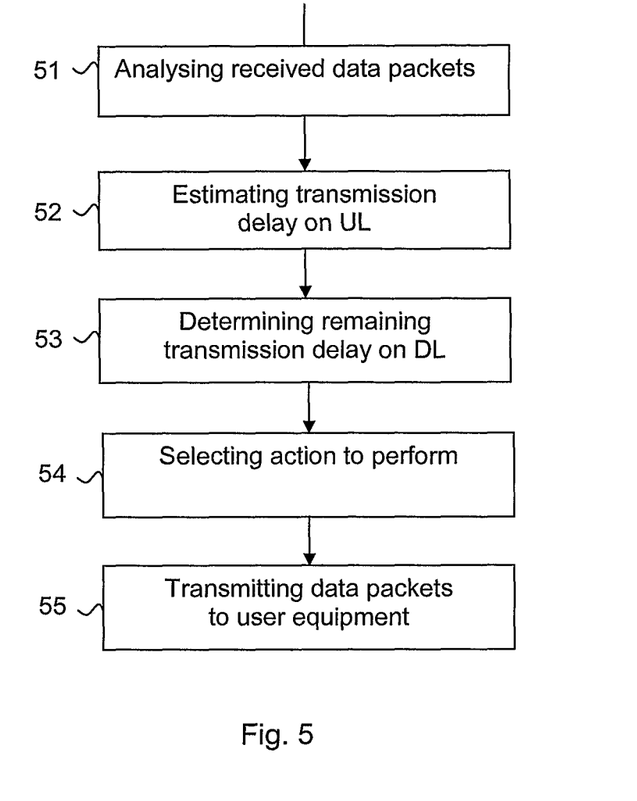
FIG. 5 is a flow chart illustrating a method in a communication network entity.

The procedure in a communication network entity, such as the BSC/PCU, for improving the performance of data packet transmissions between two user equipments via the communication network entity over an uplink transmission link and a downlink transmission link, whereby a pre-defined transmission delay is allowed for the data packets to travel from one of the user equipments to the other of the user equipments, shown in FIG. 5 is as follows:

- analysing for the downlink transmission link received data packets originated from the uplink transmission link (step 51) e.g. by at least one of the following steps: estimating a Packet Inter-arrival Time (PIT) by monitoring arrival of individual packets; and/or, estimating a Packet Inter-arrival Time (PIT) by measuring a number of packets arrived during a pre-determined period of time;
- estimating a transmission delay on said uplink transmission link based on said analysed data packets (step 52).
- determining a remaining transmission delay for said downlink transmission link (step 53);
- selecting for said analysed data packets an action based on said determined remaining transmission delay (step 54) which efficiently uses available radio resources on said downlink transmission link. The action is at least one of the following: determining maximum allowed re-transmissions on said downlink transmission link for individual data packets (which optionally is signalled to the receiving user equipment), selecting a modulation and coding scheme (MCS) based on a number of allowed re-transmissions in order to obtain an optimal robustness or, determining a time-out value for individual data packets (which optionally is signalled to the receiving user equipment);
- transmitting said data packets on said downlink transmission link to a receiving user equipment (step 55).

Figure 6:
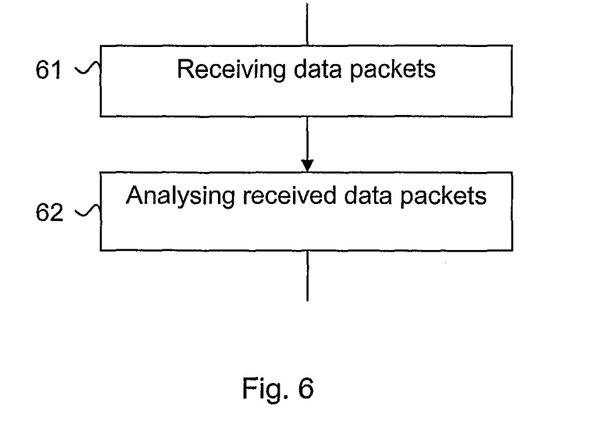
FIG. 6 is a flow chart illustrating a method in a user equipment.

The procedure in a user equipment for optimizing the performance of data packet transmissions between two user equipments via a communication network entity, such as the BSC/PCU, over an uplink transmission link and a downlink transmission link, whereby a pre-defined transmission delay is allowed for said data packets to travel from one of said user equipments to the other of said user equipments, shown in FIG. 6 is as follows:

- receiving data packets on said downlink transmission link from said communication network entity (step 61), in which communication network entity said data packets originating from said uplink transmission link have been analysed, a transmission delay on said uplink transmission link based on said analysed data packets has been estimated, a remaining transmission delay for said downlink transmission link has been determined and an action for said analysed data packets has been selected based on said determined remaining transmission delay which efficiently uses available radio resources on said downlink transmission link;
- analysing the received data packets in the user equipment (step 62), e.g. by at least one of the following steps: estimating a Packet Inter-arrival Time (PIT) by monitoring arrival of individual packets; estimating a Packet Inter-arrival Time (PIT) by measuring a number of packets arrived during a pre-determined period of time. The analysis is done to obtain a determined maximum allowed re-transmissions on said downlink transmission link and/or a determined time-out value for individual data packets. Optionally, the maximum allowed re-transmissions and/or the time-out value is signalled from the communication network entity, e.g. obtained by information in a header of the received data packets.

Figure 7:
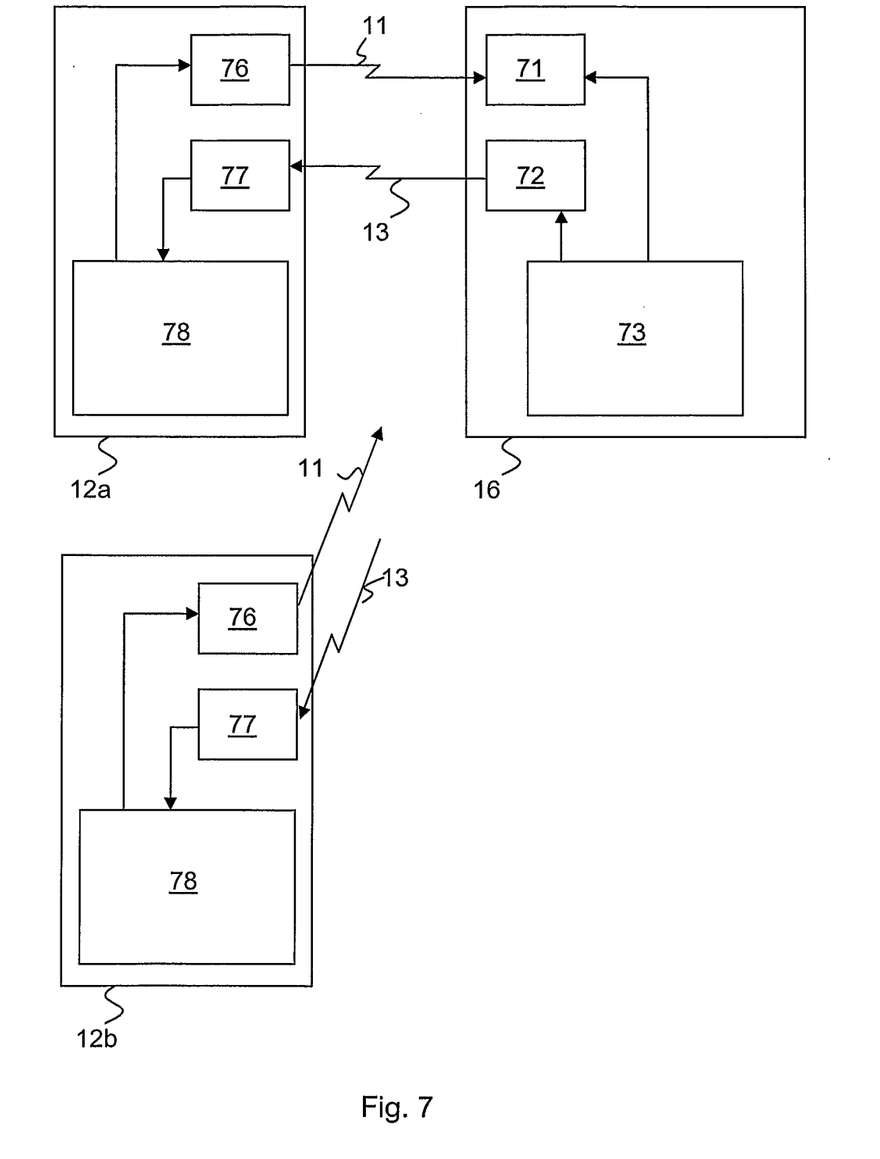
FIG. 7 is a block diagram of a communication network entity and user equipments.

FIG. 7 is a block diagram showing user equipments 12a and 12b and a communication network entity 16, such as the BSC/PCU for optimizing the performance of data packet transmissions between the two user equipments 12a and 12b via the communication network entity 16 over an uplink transmission link 11 and a downlink transmission link 13, whereby a pre-defined transmission delay is allowed for said data packets to travel from one of said user equipments 12a to the other of said user equipments 12b. The communication network entity 16 comprises a radio transmitter 72 and a receiver 71. The transmitter 72 is transmitting data to a receiver 77 of the user equipment 12a and 12b over the radio interface on the downlink channel 13. The receiver 71 is receiving data from the transmitter 76 of user equipment 12a and 12b on the uplink channel 11. The communication network entity further comprises circuitry 73 for analysing for said downlink transmission link 13 received data packets originating from said uplink transmission link 11, for estimating a transmission delay on said uplink transmission link 11 based on said analysed data packets, for determining remaining transmission delay for said downlink transmission link 13 and for selecting for said analysed data packets an action based on said determined remaining transmission delay which efficiently uses available radio resources on said downlink transmission link 13. This is described in more detail above and in conjunction with FIG. 5.

The user equipment 12a and 12b comprises a radio transmitter 76 arranged to transmit data packets to the receiver 71 of the communication network entity 16 over the radio interface on the uplink channel 11 and a receiver 77 arranged to receive data packets transmitted from the transmitter 72 of the communication network entity 16 on the downlink channel 13. The user equipment 12a and 12b further comprises circuitry 78 for analysing said received data packets as described above and in conjunction with FIG. 6.

Thus, while there have been shown and described features as applied to example embodiments, it will be understood that various omissions and substitutions and changes in the form and details of the devices illustrated, and in their operation, may be made by those skilled in the art without departing from the spirit of the claims. For example, it is expressly intended that all combinations of those elements and/or method steps which perform substantially the same function in substantially the same way to achieve the same results are within the scope of the claims. Moreover, it should be recognized that structures and/or elements and/or method steps shown and/or described in connection with any disclosed form or embodiment may be incorporated in any other disclosed or described or suggested form or embodiment. It is the intention, therefore, to be limited only as indicated by the scope of the claims.

Expressions such as "including", "comprising", "incorporating", "consisting of", "have", "is" are intended to be construed in a non-exclusive manner, namely allowing for items, components or elements not explicitly described also to be present. Reference to the singular is also to be construed to relate to the plural and vice versa.

The invention claimed is:

1. A method in a communication network entity of improving a performance of data packet transmissions between two user equipments via said communication network entity over an uplink transmission link and a downlink transmission link, whereby a pre-defined transmission delay is allowed for said data packets to travel from one of said user equipments to the other of said user equipments, the method comprising the steps of:
analysing for said downlink transmission link received data packets originating from said uplink transmission link;
estimating a transmission delay on said uplink transmission link based on said analysed data packets;
determining a remaining transmission delay for said downlink transmission link based on the pre-defined transmission delay and the estimated transmission delay;
selecting for said analysed data packets multiple actions based on said determined remaining re-transmission delay which efficiently uses available radio resources on said downlink transmission link, said actions including determining a maximum number of allowed re-transmissions on said downlink transmission link for individual data packets, a modulation and coding scheme (MCS) based on the maximum number of allowed re-transmissions to obtain an optimal robustness, and determining a time-out value for individual data packets, whereafter, transmitting said data packets on said downlink transmission link to a receiving user equipment in accordance with said actions.

2. The method according to claim 1, wherein the data packets are Voice over IP (VoIP) data packets, and wherein the VoIP data packets are delivered in accordance with a dynamic radio link control (RLC) non-persistent mode.

3. A method in a user equipment of improving the performance of data packet transmissions between two user equipments via a communication network entity over an uplink transmission link and a downlink transmission link, whereby a pre-defined transmission delay is allowed for said data packets to travel from one user equipment to said user equipment, the method comprising the steps of:
receiving data packets on said downlink transmission link from said communication network entity, in which communication network entity said data packets originating from said uplink transmission link have been analysed, a transmission delay on said uplink transmission link based on said analysed data packets has been estimated, a remaining transmission delay for said downlink transmission link has been determined based on the pre-defined transmission delay and the estimated transmission delay, and multiple actions for said analysed data packets have been selected based on said determined remaining transmission delay which efficiently uses available radio resources on said downlink transmission link, said actions including determining a maximum number of allowed re-transmissions on said downlink transmission link for individual data packets, a modulation and coding scheme (MCS) based on the maximum number of allowed re-transmissions to obtain an optimal robustness, and determining a time-out value for individual data packets;
analysing said received data packets to determine the maximum number of allowed re-transmissions on said downlink transmission link for individual data packets and the time-out value for individual data packets.

4. The method according to claim 3, wherein the data packets are Voice over IP (VoIP) data packets, and wherein the VoIP data packets are delivered in accordance with a dynamic radio link control (RLC) non-persistent mode.

5. A communication network entity for optimizing the performance of data packet transmissions between two user equipments via said communication network entity over an uplink transmission link and a downlink transmission link, whereby a pre-defined transmission delay is allowed for said data packets to travel from one of said user equipments to the other of said user equipments, said entity comprising circuitry configured:
analyse for said downlink transmission link received data packets originating from said uplink transmission link;
estimate a transmission delay on said uplink transmission link based on said analysed data packets;
determine a remaining transmission delay for said downlink transmission link based on the pre-defined transmission delay and the estimated transmission delay;
select for said analysed data packets multiple actions based on said determined remaining transmission delay which efficiently uses available radio resources on said downlink transmission link, said actions including determining a maximum number of allowed re-transmissions on said downlink transmission link for individual data packets, a modulation and coding scheme (MCS) based on the maximum number of allowed re-transmissions to obtain an optimal robustness, and determining a time-out value for individual data packets,
whereafter, transmitting said data packets on said downlink transmission link to a receiving user equipment in accordance with said actions.

6. A communication network entity according to claim 5, wherein the data packets are Voice over IP (VoIP) data packets, and wherein the VoIP data packets are delivered in accordance with a dynamic radio link control (RLC) non-persistent mode.

7. A user equipment for improving the performance of data packet transmissions between two user equipments via a communication network entity over an uplink transmission link and a downlink transmission link, whereby a pre-defined transmission delay is allowed for said data packets to travel from one user equipment to said user equipment, the user equipment comprising circuitry configured to:
receive data packets on said downlink transmission link from said communication network entity, in which communication network entity said data packets originating from said uplink transmission link have been analysed, a transmission delay on said uplink transmission link based on said analysed data packets has been estimated, a remaining transmission delay for said downlink transmission link has been determined based on the pre-defined transmission delay and the estimated transmission delay, and multiple actions for said analysed data packets have been selected based on said determined remaining transmission delay which efficiently uses available radio resources on said downlink transmission link, said actions including determining a maximum number of allowed re-transmissions on said downlink transmission link for individual data packets, a modulation and coding scheme (MCS) based on the maximum number of allowed re-transmissions to obtain an optimal robustness, and determining a time-out value for individual data packets;
analyse said received data packets to determine the maximum number of allowed re-transmissions on said downlink transmission link for individual data packets and the time-out value for individual data packets.

8. A user equipment according to claim 7, wherein the data packets are Voice over IP (VoIP) data packets, and wherein the VoIP data packets are delivered in accordance with a dynamic radio link control (RLC) non-persistent mode.

\* \* \* \* \*

UNITED STATES PATENT AND TRADEMARK OFFICE
CERTIFICATE OF CORRECTION

PATENT NO. : 8,432,841 B2
APPLICATION NO. : 12/739906
DATED : April 30, 2013
INVENTOR(S) : Björkén et al.

Page 1 of 1

It is certified that error appears in the above-identified patent and that said Letters Patent is hereby corrected as shown below:

In the Specification

Column 3, line 65, delete "Transciever" and insert therefor -- Transceiver --

In the Claims

Column 10, Line 32, in Claim 6, delete "A communication" and insert therefor
-- The communication --

Column 11, line 1, in Claim 8, delete "A user" and insert therefor -- The user --

Signed and Sealed this
Twenty-sixth Day of November, 2013

Margaret A. Focarino
*Commissioner for Patents of the United States Patent and Trademark Office*